US012771210B2

(12) United States Patent
Ishii

(10) Patent No.: US 12,771,210 B2
(45) Date of Patent: Oct. 20, 2026

(54) MOTOR-COOLING STRUCTURE

(71) Applicant: SUBARU CORPORATION, Tokyo (JP)

(72) Inventor: Tatsuya Ishii, Tokyo (JP)

(73) Assignee: Subaru Corporation, Tokyo (JP)

(*) Notice: Subject to any disclaimer, the term of this patent is extended or adjusted under 35 U.S.C. 154(b) by 185 days.

(21) Appl. No.: 18/787,718

(22) Filed: Jul. 29, 2024

(65) Prior Publication Data

US 2025/0096648 A1 Mar. 20, 2025

(30) Foreign Application Priority Data

Sep. 19, 2023 (JP) ................................ 2023-151748

(51) Int. Cl.
*H02K 9/193* (2006.01)
*H02K 5/20* (2006.01)

(52) U.S. Cl.
CPC ............. *H02K 9/193* (2013.01); *H02K 5/203* (2021.01)

(58) Field of Classification Search
CPC ........... H02K 5/203; H02K 9/19; H02K 9/193
USPC ........................................................ 310/60 R
See application file for complete search history.

(56) References Cited

U.S. PATENT DOCUMENTS 9,249,801 B2 * 2/2016 Fukasaku ............ F04C 18/0215
9,847,698 B2 * 12/2017 Yoshinori ................ H02K 9/19
11,011,960 B2 * 5/2021 Do .......................... H02K 9/19
2005/0151429 A1 * 7/2005 Taketsuna ................ H02K 3/24 310/54
2008/0083572 A1 * 4/2008 Ishida .................. B60K 7/0007 180/55
2009/0121562 A1 * 5/2009 Yim ....................... H02K 9/193 903/906
2011/0012448 A1 * 1/2011 Tanaka ..................... H02K 5/18 310/54
2013/0069456 A1 * 3/2013 Matsuki ................. H02K 5/203 310/54
2014/0090412 A1 * 4/2014 Fukasaku ............ F04C 29/0035 417/410.5
2014/0339934 A1 * 11/2014 Yoshiizumi ............ H02K 5/203 310/54

(Continued)

FOREIGN PATENT DOCUMENTS

JP 2004-112967 A 4/2004
JP 2010263696 A * 11/2010 ............... H02K 9/19

(Continued)

*Primary Examiner* — Alex W Mok
(74) *Attorney, Agent, or Firm* — McGinn IP Law Group, PLLC

(57) ABSTRACT

A motor-cooling structure is configured to cool a motor by using cooling oil. The motor is housed in a motor case. The motor-cooling structure includes a supply-port operator and a discharge-port operator. The supply-port operator is capable of opening and closing a cooling-oil supply port provided in a first wall of the motor case. The supply-port operator is configured to make an opening ratio of the cooling-oil supply port greater when a rotary shaft of the motor is stationary than when the rotary shaft is rotating. The discharge-port operator is capable of opening and closing a cooling-oil discharge port provided in a second wall of the motor case. The discharge-port operator is configured to close the cooling-oil discharge port when the rotary shaft of the motor is stationary.

8 Claims, 7 Drawing Sheets

(56) References Cited

U.S. PATENT DOCUMENTS

| | | | | |
|---|---|---|---|---|
| 2015/0015099 | A1* | 1/2015 | Matsuki | H02K 9/193<br>310/61 |
| 2019/0229582 | A1 | 7/2019 | Ito et al. | |
| 2021/0336506 | A1* | 10/2021 | Kim | H02K 9/19 |
| 2022/0281310 | A1* | 9/2022 | Nakata | F16H 57/045 |

FOREIGN PATENT DOCUMENTS

| | | | | |
|---|---|---|---|---|
| JP | 5448559 | B2 * | 3/2014 | H02K 9/19 |
| JP | 2019-129608 | A | 8/2019 | |
| WO | WO-2010128632 | A1 * | 11/2010 | H02K 9/19 |

* cited by examiner

MOTOR-COOLING STRUCTURE

CROSS-REFERENCE TO RELATED APPLICATIONS

The present application claims priority from Japanese Patent Application No. 2023-151748 filed on Sep. 19, 2023, the entire contents of which are hereby incorporated by reference.

BACKGROUND

The disclosure relates to a motor-cooling structure, particularly a motor-cooling structure configured to cool a motor by supplying cooling oil to the motor.

Electrically drivable vehicles and hybrid vehicles including motors serving as drive sources for the vehicles to travel may fall into a state called motor lock-up, in which a torque is attempted to be generated with the motor being stationary. Such a state occurs in, for example, hill-hold control in which a vehicle on a climbing road is prevented from traveling backward. In the state of motor lock-up, a high current may intensely flow through the coil of the motor. If such a high current continues to flow through the coil, the coil or a switching element of an inverter that is coupled to the coil may be overheated and be deteriorated. Therefore, electrically drivable vehicles and the like employ a technique of cooling the coil of the motor by using a coolant such as oil or water.

An exemplary motor-cooling device intended for electrically drivable vehicles including motors for the vehicles to travel is described in Japanese Unexamined Patent Application Publication No. 2019-129608. The device includes a cooling circuit configured to cause an oil pump to pump cooling oil stored in a case that houses a motor and to discharge the cooling oil to the coil of the motor. In this device, a temperature sensor detects the temperature of the stator of the motor. If the detected temperature goes above a predetermined temperature and indicates a high-temperature state, the oil pump is activated to discharge the cooling oil to the coil, whereby the coil is cooled.

Another motor-cooling structure is described in Japanese Unexamined Patent Application Publication No. 2004-112967. The structure includes a water jacket that allows cooling water to flow therethrough. The water jacket is disposed inside the stator core of the motor. In this cooling structure, the cooling water that flows inside the water jacket cools the coil with the intermediary of the stator core.

SUMMARY

An aspect of the disclosure provides a motor-cooling structure configured to cool a motor by using cooling oil. The motor is housed in a motor case. The motor-cooling structure includes a supply-port operator and a discharge-port operator. The supply-port operator is capable of opening and closing a cooling-oil supply port provided in a first wall of the motor case. The supply-port operator is configured to make an opening ratio of the cooling-oil supply port greater when a rotary shaft of the motor is stationary than when the rotary shaft is rotating. The discharge-port operator is capable of opening and closing a cooling-oil discharge port provided in a second wall of the motor case. The discharge-port operator is configured to close the cooling-oil discharge port when the rotary shaft of the motor is stationary.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

and

Figure 7:
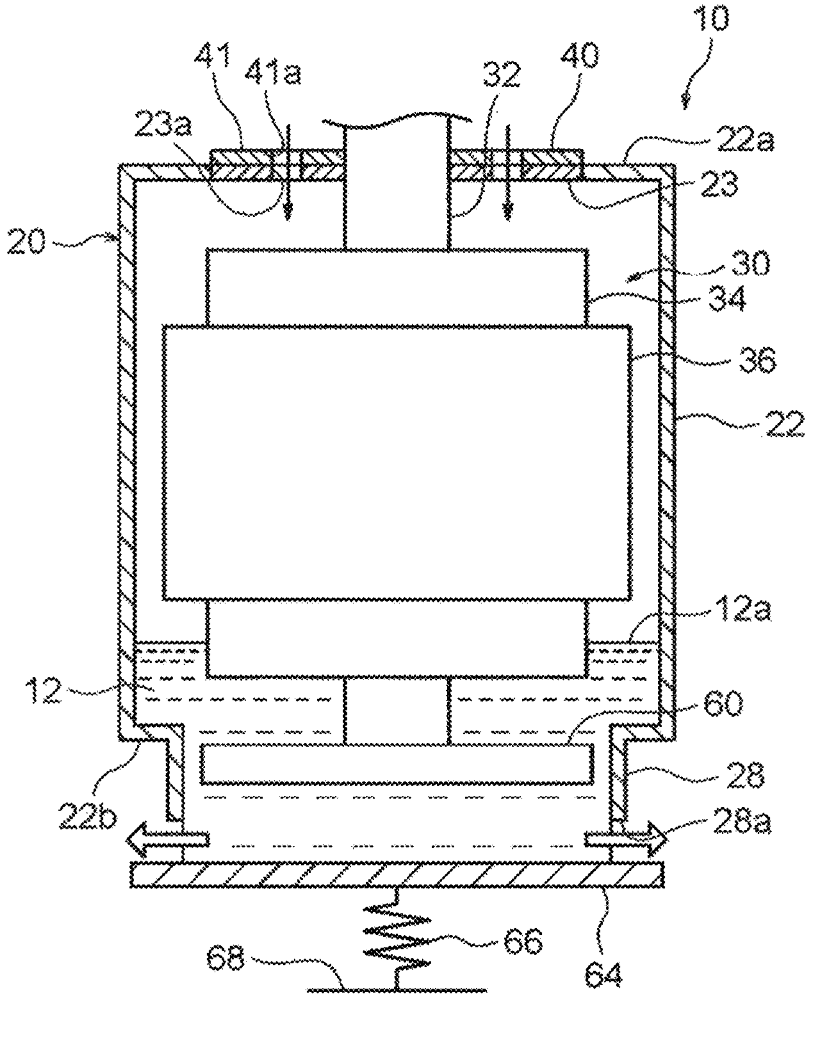
FIG. 7 outlines a motor-cooling structure according to an embodiment of the disclosure.
Figure 8:
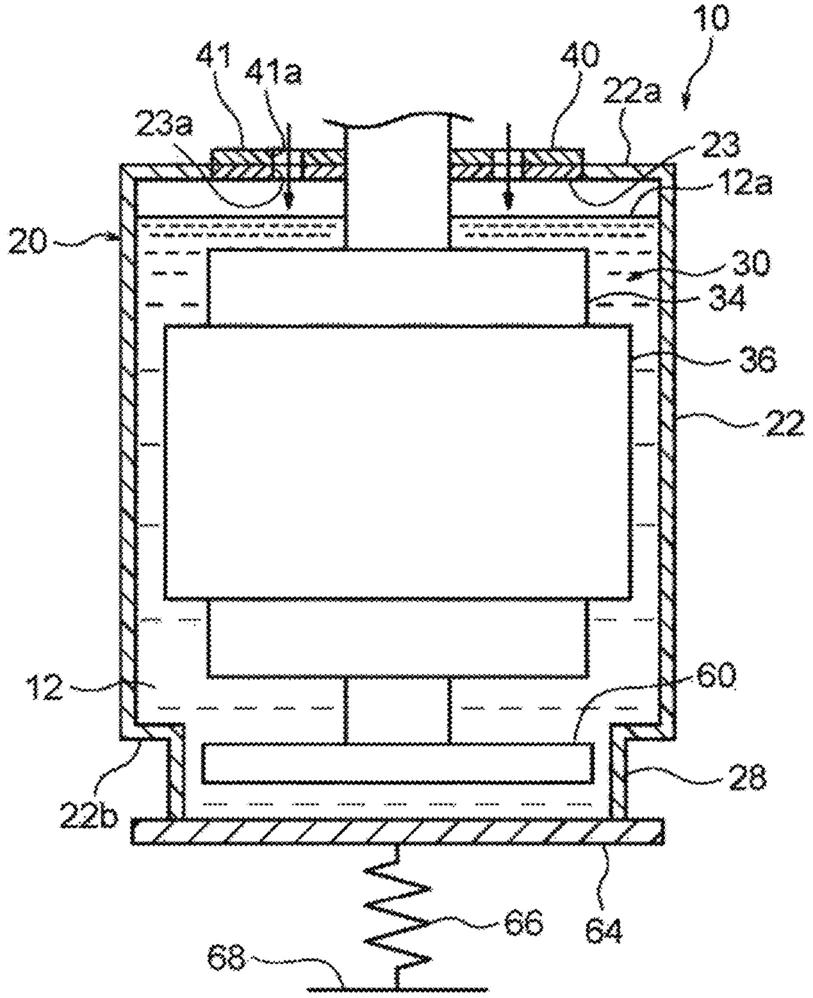

FIG. 8 illustrates the motor-cooling structure illustrated in FIG. 7 that is in a state of motor lock-up.

DETAILED DESCRIPTION

When a motor is used with a short-time rating such as in the state of motor lock-up, the motor coolability depends on the heat capacity of the motor-cooling structure. In the technique of discharging cooling oil to the coil of the motor, the heat capacity for absorbing heat from the coil may be insufficient, and there is room for improving the short-time rating. In the technique of causing cooling water to flow through a water jacket, since the coil is indirectly cooled with the intermediary of the stator core, the cooling efficiency may be low.

In view of the above, it is desirable to provide a motor-cooling structure that exerts an increased cooling efficiency by increasing the heat capacity thereof when the motor falls into a lock-up state.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
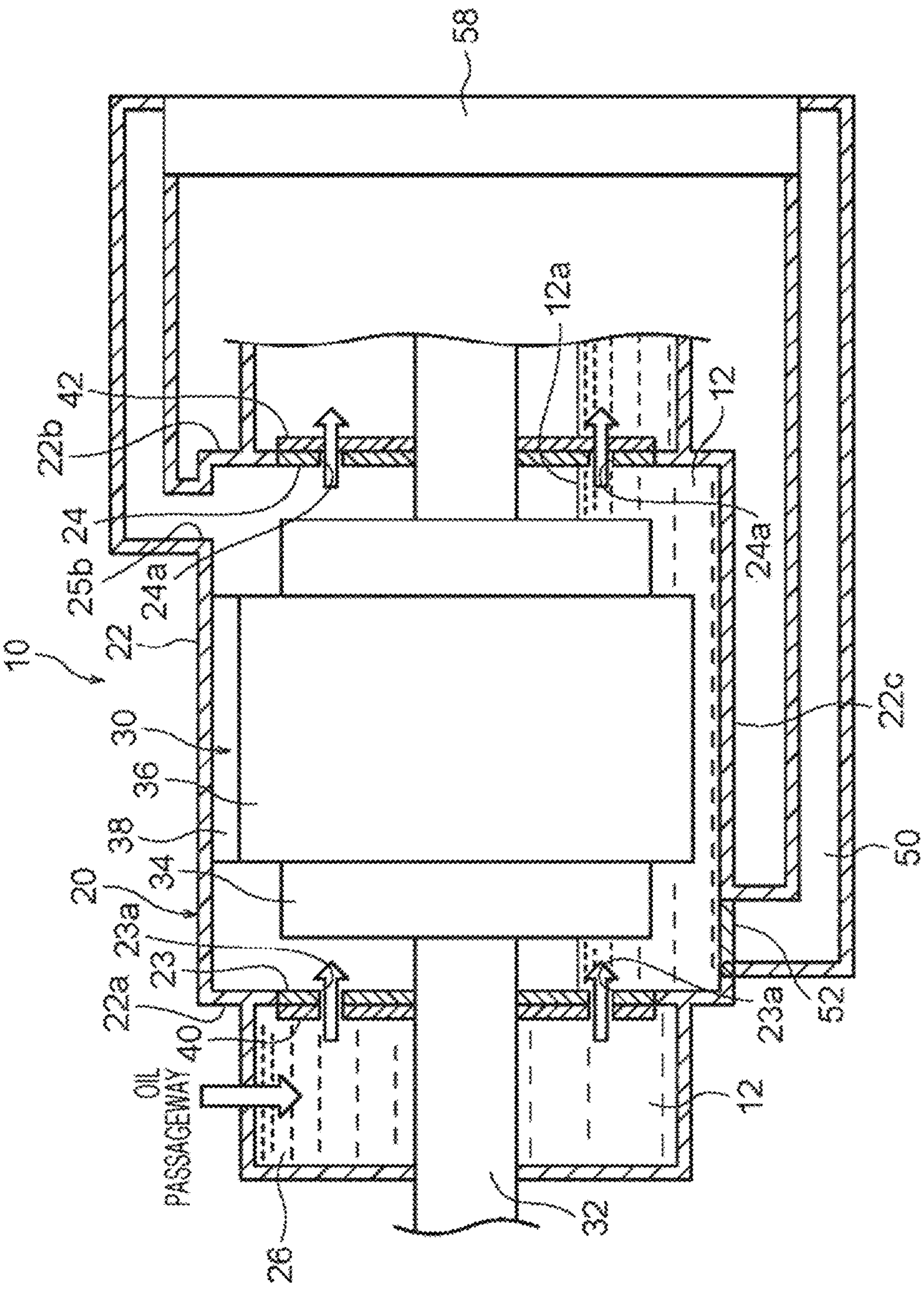
FIG. 1 outlines a motor-cooling structure according to an embodiment of the disclosure.

FIG. 1 outlines a motor-cooling structure 10 according to a first embodiment of the disclosure. The motor-cooling structure 10 according to the first embodiment is applicable to such a vehicle, as an electrically drivable vehicle or a hybrid vehicle, that includes a motor 30 serving as a drive source for the vehicle to travel. The cooling structure 10 is configured to cool the motor 30 by using cooling oil 12. The motor 30 is housed in a motor case 22. The cooling oil 12 flows through an oil passageway provided in a power transmission mechanism of the vehicle. The cooling structure 10 according to the first embodiment includes a case 20, the motor 30, and a cooling-oil circuit 50. The motor 30 is housed in the motor case 22, which is a portion of the case 20. The motor case 22 has cooling-oil supply ports 23*a* and cooling-oil discharge ports 24*a*. The cooling structure 10 further includes a supply-port operator 40 and a discharge-port operator 42, which are capable of opening and closing the cooling-oil supply ports 23*a* and the cooling-oil discharge ports 24*a*, respectively.

The case 20 is a housing that houses the motor 30 and the power transmission mechanism (not illustrated). The case 20 includes the motor case 22 that houses the motor 30. In the first embodiment, the case 20 has a storage chamber 26, which is located adjacent to the motor case 22 and in which the cooling oil 12 is to be stored. The storage chamber 26 receives the cooling oil 12 flowing from the oil passageway and stores the cooling oil 12.

The motor case 22 includes a first wall 22*a*, a second wall 22*b*, and a third wall 22*c*. The first wall 22*a* separates the storage chamber 26 and a housing chamber of the motor 30 from each other. The second wall 22*b* is located apart from and opposite the first wall 22*a*. The third wall 22*c* couples the first wall 22*a* and the second wall 22*b* to each other. The motor 30 has a rotary shaft 32, which extends through the first wall 22*a* and the second wall 22*b*. The third wall 22*c* surrounds the outer peripheral surface of the motor 30.

Figure 2:
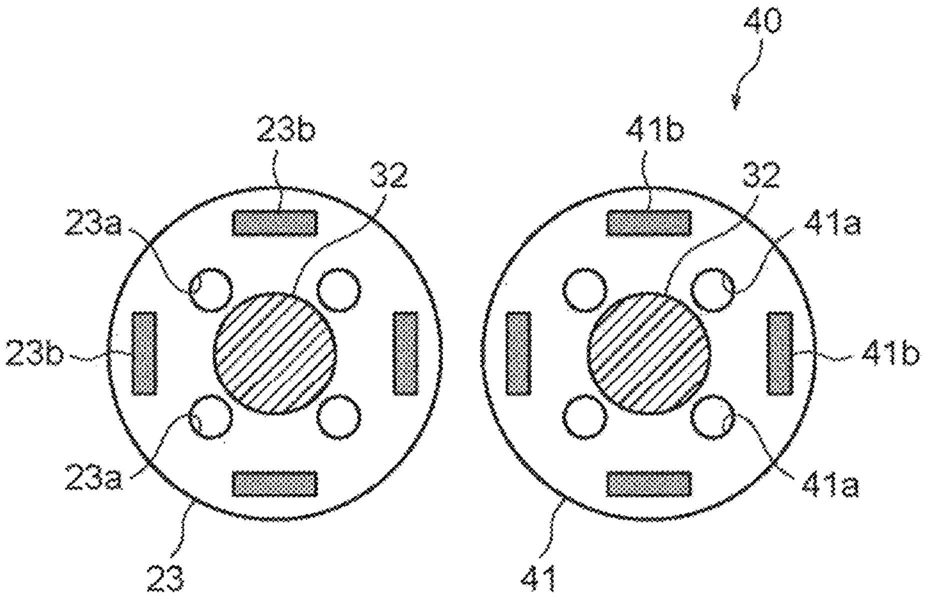
FIG. 2 illustrates a first disc and a supply-port operator that are disposed at a first wall.

As illustrated in FIG. 1, the first wall 22*a* has the cooling-oil supply ports 23*a* (hereinafter also simply referred to as "supply ports 23*a*"), through which the cooling oil 12 is to be supplied into the motor case 22. In the first embodiment, as illustrated in FIGS. 1 and 2, a first disc 23 is fixed to the first wall 22*a*, and the first disc 23 has the supply ports 23*a*. The first disc 23 has in the center thereof a through-hole through which the rotary shaft 32 of the motor 30 extends. The supply ports 23*a* are arranged around the through-hole. While the first embodiment relates to a case where the first disc 23 has four circular supply ports 23*a*, at least one supply port 23*a* having any shape may be provided. If multiple supply ports 23*a* are provided, the multiple supply ports 23*a* may be arranged at regular intervals in the peripheral direction in some embodiments.

The first disc 23 is provided with first magnets 23*b* (first supply-side magnets), which are each a permanent magnet. While the first disc 23 in the example illustrated in FIG. 2 has four first magnets 23*b* arranged at regular intervals in the peripheral direction, the first disc 23 may include at least two magnets 23*b*. The first magnets 23*b* each have magnetic poles such that the first magnets 23*b* and second magnets 41*b* attract each other. The second magnets 41*b* are disposed at the supply-port operator 40 described below.

Figure 3:
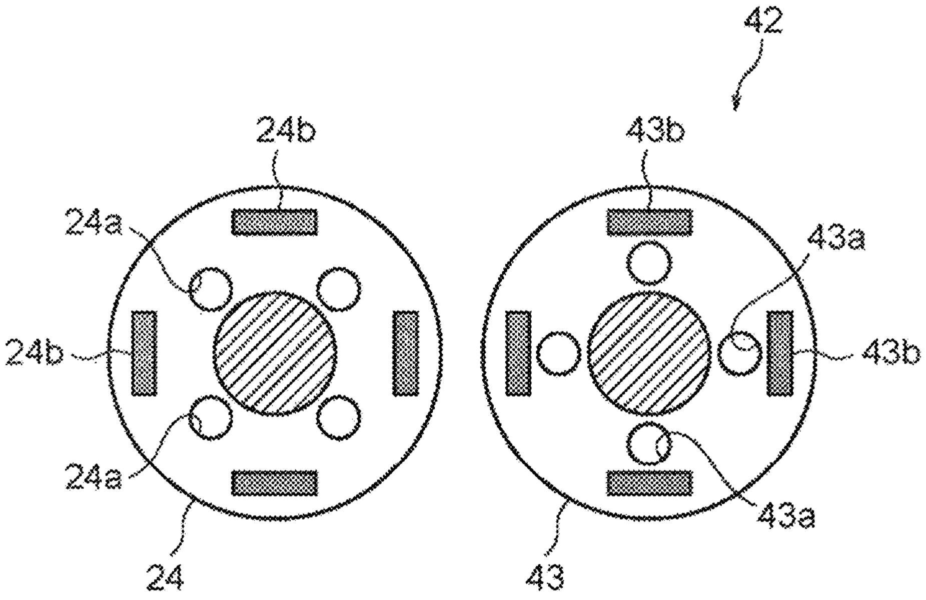
FIG. 3 illustrates a second disc and a discharge-port operator that are disposed at a second wall.

The second wall 22*b* has the cooling-oil discharge ports 24*a* (hereinafter also simply referred to as "discharge ports 24*a*"), through which the cooling oil 12 is to be discharged to the outside of the motor case 22. In the first embodiment, as illustrated in FIGS. 1 and 3, a second disc 24 is fixed to the second wall 22*b*, and the second disc 24 has the discharge ports 24*a*. The second disc 24 has in the center thereof a through-hole through which the rotary shaft 32 of the motor 30 extends. The discharge ports 24*a* are arranged around the through-hole. While the first embodiment relates to a case where the second disc 24 has four circular discharge ports 24*a*, at least one discharge port 24*a* having any shape may be provided. If multiple discharge ports 24*a* are provided, the multiple discharge ports 24*a* may be arranged at regular intervals in the peripheral direction in some embodiments.

The second disc 24 is provided with third magnets 24*b* (first discharge-side magnets), which are each a permanent magnet. While the second disc 24 in the example illustrated in FIG. 3 has four third magnets 24*b* arranged at regular intervals in the peripheral direction, the second disc 24 may include at least two magnets 24*b*. The third magnets 24*b* each have magnetic poles such that the third magnets 24*b* and fourth magnets 43*b* attract each other. The fourth magnets 43*b* are disposed at the discharge-port operator 42 described below.

The motor case 22 is coupled to the cooling-oil circuit 50, through which the cooling oil 12 supplied into the motor case 22 is to be caused to circulate. The cooling-oil circuit 50 has a passageway that couples an outlet 25*a* (illustrated in FIG. 4) and an inlet 25*b* to each other. The outlet 25*a* is provided at the bottom of the third wall 22*c* of the motor case 22. The inlet 25*b* is provided at the top of the third wall 22*c* of the motor case 22. The passageway in the cooling-oil circuit 50 is provided with an oil cooler 58 and a pump (not illustrated). The oil cooler 58 is configured to cool the cooling oil 12 flowing in the passageway. The motor case 22 is provided with a valve 52, which is capable of opening and closing the outlet 25*a*. The valve 52 opens when the amount of the cooling oil 12 stored in the motor case 22 exceeds a predetermined value to apply a pressure to the valve 52. The valve 52 is closed when the amount of the cooling oil 12 stored in the motor case 22 is the predetermined value or smaller.

The motor 30 includes a stator 36, a rotor (not illustrated), and the rotary shaft 32. The stator 36 is fixed to the motor case 22 with a fitting member 38 in between. The rotor is disposed on the inner side of the stator 36. The rotary shaft 32 is configured to rotate together with the rotor. The stator 36 is provided with a coil 34. In FIG. 1, a coil end of the coil 34 that projects from the stator 36 is illustrated. The rotor includes layers of plates in which permanent magnets are embedded. The rotary shaft 32 passes through the first wall 22*a* and the second wall 22*b* of the motor case 22 and extends substantially horizontally. The supply-port operator 40 and the discharge-port operator 42 are attached to the rotary shaft 32 in such a manner as to adjoin and coincide with the disc 23 at the first wall 22*a* and the disc 24 at the second wall 22*b*, respectively.

The supply-port operator 40 is capable of opening and closing the supply ports 23*a* of the motor case 22. The supply ports 23*a* are opened and closed when the rotary shaft 32 of the motor 30 is rotating. When the rotary shaft 32 is stationary, the opening ratio of the supply ports 23*a* is greater than when the rotary shaft 32 is rotating. As illustrated in FIG. 2, the supply-port operator 40 includes a supply-port-operator body 41 having a disc shape and the second magnets 41*b* (second supply-side magnets). The supply-port-operator body 41 has supply-use through-holes 41*a*. The second magnets 41*b* are disposed at the supply-port-operator body 41.

The supply-port-operator body 41 has in the center thereof a through-hole through which the rotary shaft 32 extends. The supply-port-operator body 41 is attached to the rotary shaft 32 in such a manner as to coincide with the disc 23 at the first wall 22*a* and to rotate together with the rotary shaft 32. In the first embodiment, the supply-port-operator body 41 has a disc shape that is of substantially the same size as the first disc 23. The supply-use through-holes 41*a* are four through-holes arranged at regular intervals in the peripheral direction and in correspondence with the supply ports 23*a* of the first disc 23. The second magnets 41*b* each have magnetic poles such that the second magnets 41*b* and the first magnets 23*b* of the disc 23 at the first wall 22*a* of the motor case 22 attract each other. The second magnets 41*b* and the first magnets 23*b* are of equal number.

The supply-use through-holes 41*a* and the second magnets 41*b* move in the peripheral direction with the rotation of the supply-port-operator body 41. The supply-use through-holes 41*a* are provided at positions where the supply-use through-holes 41*a* coincide with the respective supply ports 23*a* of the motor case 22 when the second magnets 41*b* coincide with the first magnets 23*b* of the motor case 22 during the rotation of the supply-port-operator body 41. In the first embodiment, as illustrated in FIG. 2, the arrangement of the supply ports 23*a* and the first magnets 23*b* of the first disc 23 and the arrangement of the supply-use through-holes 41*a* and the second magnets 41*b* of the supply-port operator 40 are substantially the same.

The discharge-port operator 42 is capable of opening and closing the discharge ports 24*a* of the motor case 22. The discharge ports 24*a* are opened and closed when the rotary shaft 32 of the motor 30 is rotating. When the rotary shaft 32 is stationary, the discharge ports 24*a* are closed. As illustrated in FIG. 3, the discharge-port operator 42 includes a discharge-port-operator body 43 having a disc-shape and the fourth magnets 43*b* (second discharge-side magnets). The discharge-port-operator body 43 has discharge-use through-holes 43*a*. The fourth magnets 43*b* are disposed at the discharge-port-operator body 43.

The discharge-port-operator body 43 has in the center thereof a through-hole through which the rotary shaft 32 extends. The discharge-port-operator body 43 is attached to the rotary shaft 32 in such a manner as to coincide with the disc 24 at the second wall 22*b* and to rotate together with the rotary shaft 32. In the first embodiment, the discharge-port-operator body 43 has a disc shape that is of substantially the same size as the second disc 24. The discharge-use through-holes 43*a* are four through-holes arranged at regular intervals in the peripheral direction and in correspondence with the discharge ports 24*a* of the second disc 24. The fourth magnets 43*b* each have magnetic poles such that the fourth magnets 43*b* and the third magnets 24*b* of the disc 24 at the second wall 22*b* of the motor case 22 attract each other. The fourth magnets 43*b* and the third magnets 24*b* are of equal number.

The discharge-use through-holes 43*a* and the fourth magnets 43*b* move in the peripheral direction with the rotation of the discharge-port-operator body 43. The discharge-use through-holes 43*a* are provided at positions where the discharge-use through-holes 43*a* are allowed to coincide with the respective discharge ports 24*a* of the motor case 22 during the movement of the discharge-use through-holes 43*a* in the peripheral direction. The discharge-use through-holes 43*a* are provided at positions where the discharge-use through-holes 43*a* are displaced relative to the respective discharge ports 24*a* when the fourth magnets 43*b* coincide with the third magnets 24*b* of the motor case 22 during the rotation of the discharge-port-operator body 43. In the first embodiment, as illustrated in FIG. 3, when the third magnets 24*b* of the second disc 24 and the fourth magnets 43*b* of the discharge-port operator 42 coincide with each other in the peripheral direction, the discharge ports 24*a* and the discharge-use through-holes 43*a* are displaced relative to each other in the peripheral direction.

While the supply-port operator 40 and the discharge-port operator 42 according to the first embodiment illustrated in FIG. 1 are disposed outside the motor case 22, the operators 40 and 42 may alternatively be disposed inside the motor case 22 in such a manner as to coincide with the respective discs 23 and 24. Furthermore, the supply-port operator 40 and the discharge-port operator 42 are not limited to be permanently fixed to the rotary shaft 32 and may be rotatable relative to the rotary shaft 32 in the forward and backward directions of the rotary shaft 32.

Figure 4:
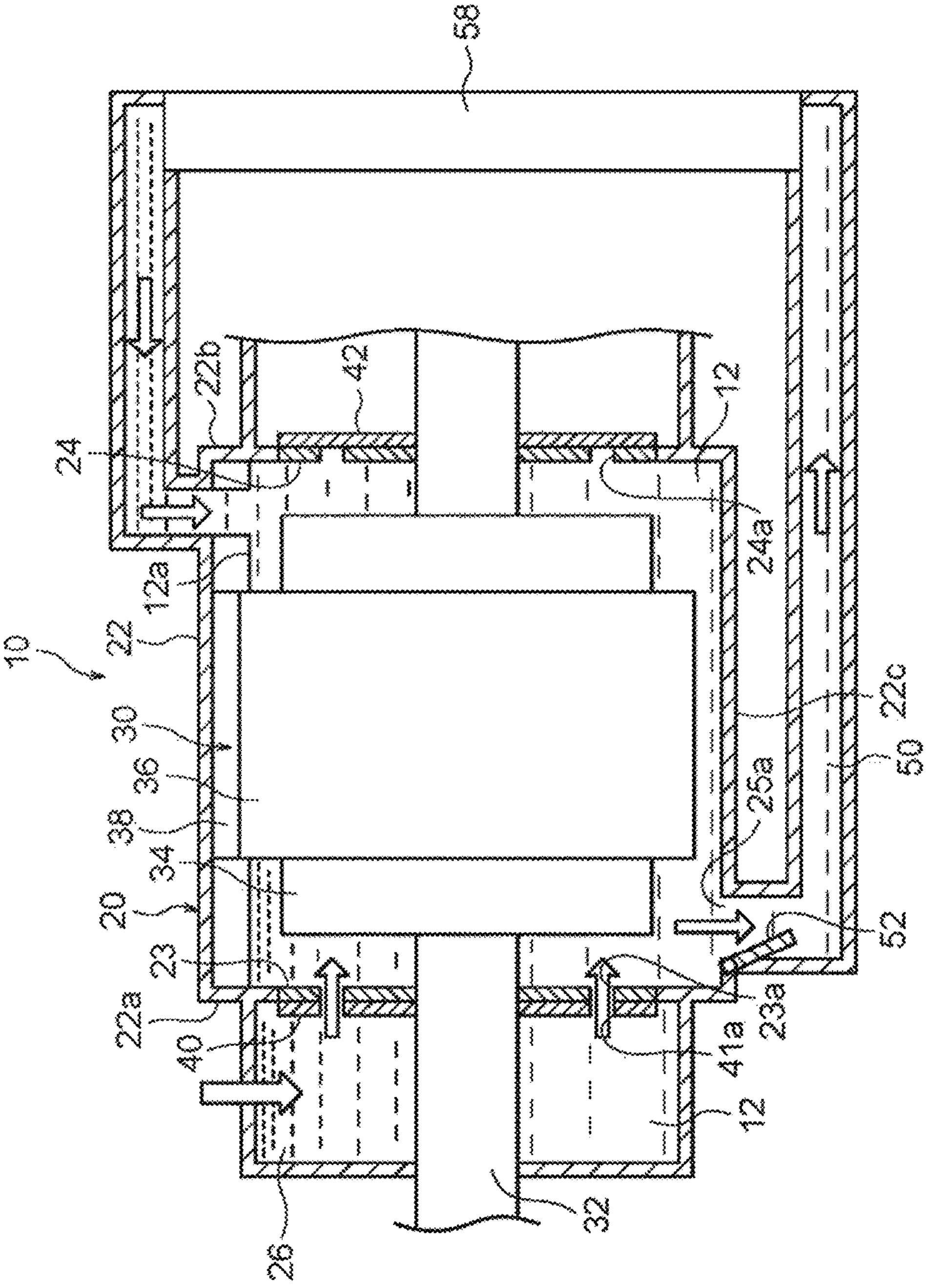
FIG. 4 illustrates the motor-cooling structure illustrated in FIG. 1 that is in a state of motor lock-up.

Operations of the above-described cooling structure 10 in a normal state where the rotary shaft 32 of the motor 30 is rotating and in a lock-up state where the rotary shaft 32 of the motor 30 is stationary will be described. In FIGS. 1 and 4, white arrows represent the direction in which the cooling oil 12 flows. In the normal state, as illustrated in FIG. 1, the rotary shaft 32 of the motor 30 rotates, whereby the supply-port operator 40 and the discharge-port operator 42 rotate. During the rotation of the supply-port operator 40, the supply ports 23*a* of the motor case 22 are opened when coinciding with the supply-use through-holes 41*a*, and are closed when displaced relative to the supply-use through-holes 41*a* in the peripheral direction. In the normal state, the supply ports 23*a* are repeatedly opened and closed by the supply-port operator 40. When the supply ports 23*a* are open, the cooling oil 12 stored in the storage chamber 26 is supplied into the motor case 22. Likewise, during the rotation of the discharge-port operator 42, the discharge ports 24*a* of the motor case 22 are repeatedly opened and closed such that the discharge ports 24*a* are opened when coinciding with the discharge-use through-holes 43*a* and are closed when displaced relative to the discharge-use through-holes 43*a* in the peripheral direction. When the discharge ports 24*a* are open, the cooling oil 12 supplied into the motor case 22 is discharged through the discharge ports 24*a* to the outside of the motor case 22. Thus, in the normal state, the cooling oil 12 is supplied into and discharged from the motor case 22. Therefore, the amount of the cooling oil 12 in the motor case 22 is relatively small, with an oil level 12*a* being kept low.

Referring to FIG. 4, the lock-up state where the rotary shaft 32 of the motor 30 is stationary will be described. In the lock-up state, the rotation of the rotary shaft 32 of the motor 30 is stopped. Furthermore, as illustrated in FIG. 2, the second magnets 41*b* of the supply-port operator 40 attached to the rotary shaft 32 and the first magnets 23*b* of the motor case 22 attract each other and coincide with each other. Accordingly, the supply ports 23*a* of the motor case 22 are kept open. Furthermore, when the rotation of the rotary shaft 32 of the motor 30 is stopped, as illustrated in FIG. 3, the fourth magnets 43*b* of the discharge-port operator 42 and the third magnets 24*b* of the motor case 22 attract each other and coincide with each other. Accordingly, the discharge ports 24*a* of the motor case 22 are kept closed, whereby the discharge of the cooling oil 12 is stopped. Consequently, the cooling oil 12 supplied through the supply ports 23*a* accumulates in the motor case 22. In the lock-up state, the supply ports 23*a* are constantly open. Therefore, the opening ratio of the supply ports 23*a* per unit time is greater than in the normal state, making the amount of the cooling oil 12 supplied into the motor case 22 greater than in the normal state.

In the lock-up state, since the cooling oil 12 accumulates in the motor case 22, the oil level 12*a* of the cooling oil 12 rises, whereby the motor 30 is immersed in the cooling oil 12. If a vehicle including the cooling structure 10 according to the first embodiment undergoes, for example, hill-hold control to prevent the backward traveling of the vehicle on a climbing road, a state called motor lock-up occurs in which a torque is attempted to be generated with the motor 30 being stationary. When the motor 30 is locked up, a high current may intensely flow through the coil 34 of the motor 30 and may increase the temperature of the coil 34. When the cooling structure 10 according to the first embodiment falls into the lock-up state, the motor 30 is immersed in the cooling oil 12, whereby the heat capacity for absorbing heat from the coil 34 is increased. Thus, the coil 34 is cooled with an increased efficiency.

Furthermore, if the amount of the cooling oil 12 accumulated in the motor case 22 in the lock-up state exceeds a predetermined value, the valve 52 having been closing the outlet 25*a* at the bottom of the motor case 22 is opened. Accordingly, the cooling oil 12 in the motor case 22 circulates through the cooling-oil circuit 50 and is cooled by the oil cooler 58 disposed at the cooling-oil circuit 50. When the cooling oil 12 absorbs heat from the coil 34, the temperature of the cooling oil 12 rises. Nevertheless, since the cooling oil 12 is cooled by the oil cooler 58 in the cooling-oil circuit 50, the efficiency of cooling the coil 34 is kept high.

Second Embodiment

Figure 5:
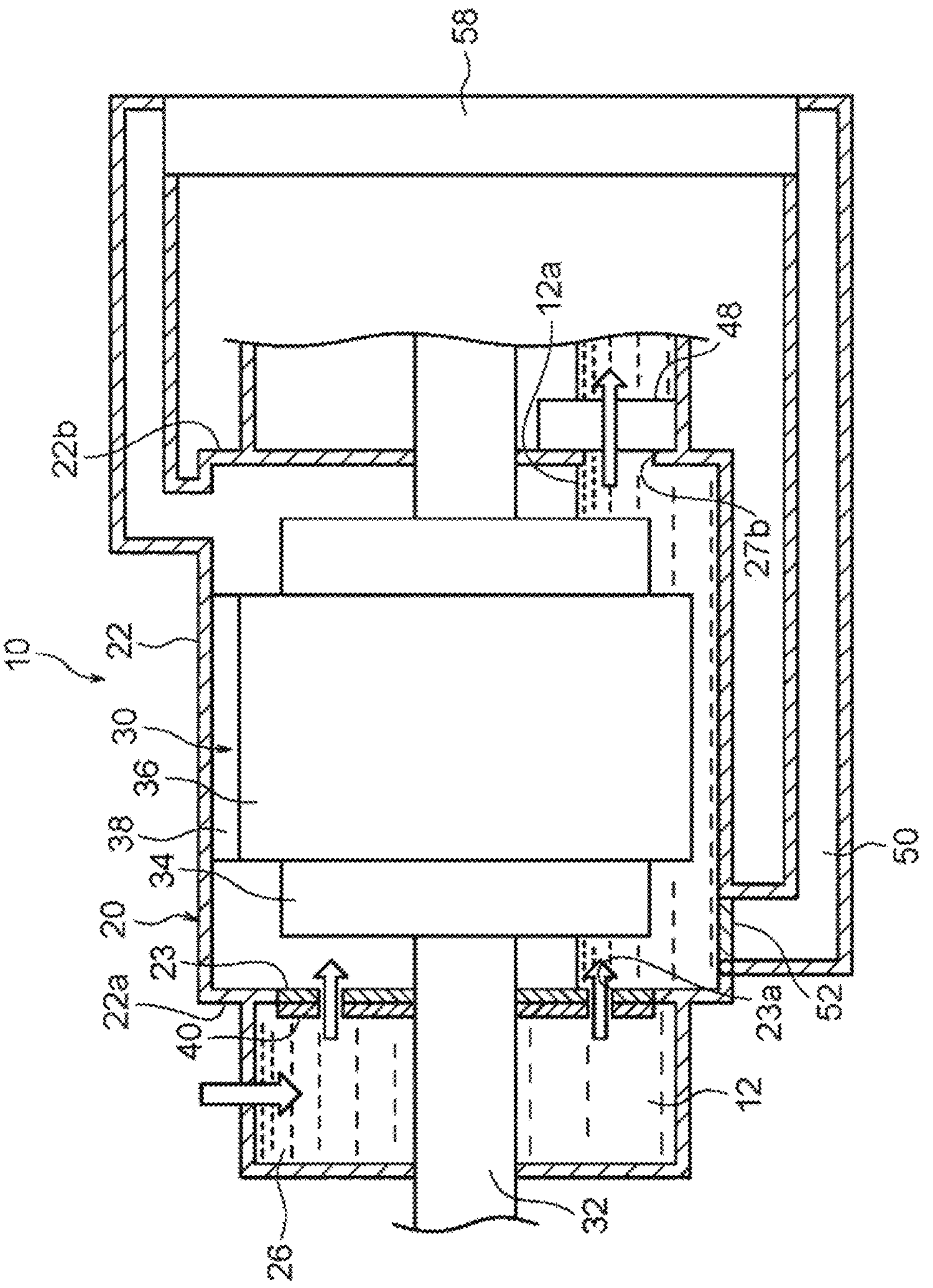
FIG. 5 outlines a motor-cooling structure according to an embodiment of the disclosure.
Figure 6:
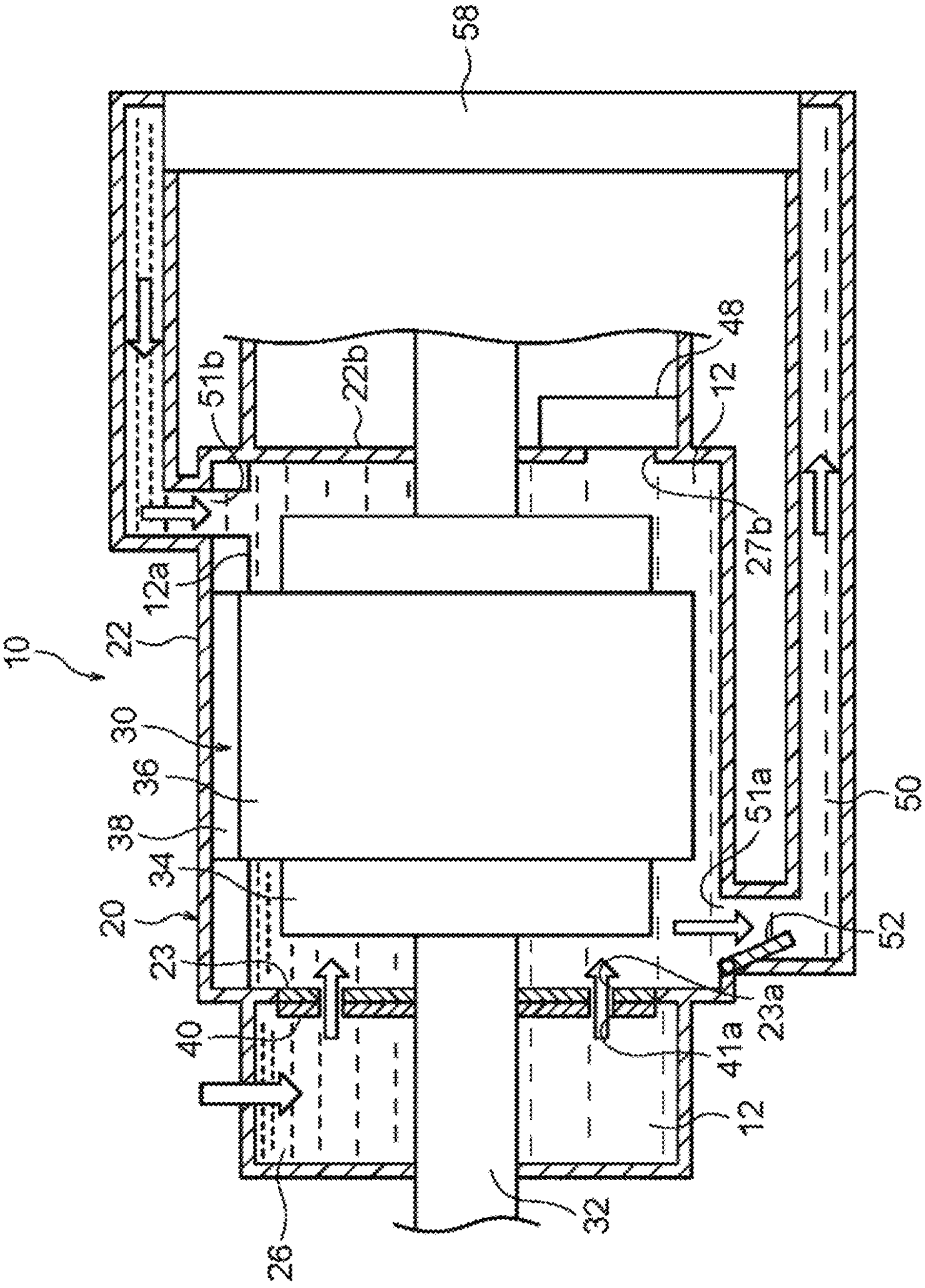
FIG. 6 illustrates the motor-cooling structure illustrated in FIG. 5 that is in a state of motor lock-up.

Referring to FIGS. 5 and 6, a second embodiment of the motor-cooling structure 10 will be described. In the drawings, elements equivalent to those of the first embodiment are denoted by the same reference signs. In the following description of the second embodiment, detailed description of configurations that are the same as in the first embodiment is omitted. The second embodiment is basically the same as the first embodiment, except the configuration of a part of the motor case 22 where the cooling oil 12 is to be discharged.

In the second embodiment, a cooling-oil discharge port 27*b* is provided at a lower position of the second wall 22*b*. On the outer side of the second wall 22*b* is disposed a trochoid pump 48, which serves as a discharge-port operator that is capable of opening and closing the discharge port 27*b*. The trochoid pump 48 communicates with the discharge port 27*b* and is configured to operate in conjunction with the rotary shaft 32 of the motor 30.

When the cooling structure 10 according to the second embodiment is in the normal state where the motor 30 is rotating, the trochoid pump 48 is activated to open the discharge port 27*b*. Accordingly, the cooling oil 12 stored in the motor case 22 is discharged through the discharge port 27*b* to the outside of the motor case 22. In the lock-up state where the motor 30 is stationary, the operation of the trochoid pump 48 is stopped to close the discharge port 27*b*. Accordingly, the discharge of the cooling oil 12 is stopped, and the cooling oil 12 accumulates in the motor case 22. Hence, in the lock-up state, the motor 30 is immersed in the cooling oil 12, whereby the heat capacity for absorbing heat from the coil 34 is increased. Thus, the coil 34 is cooled with an increased efficiency.

Third Embodiment

Referring to FIGS. 7 and 8, a third embodiment of the motor-cooling structure 10 will be described. In the drawings, elements equivalent to those of the first embodiment are denoted by the same reference signs. In the following description of the third embodiment, detailed description of configurations that are the same as in the first embodiment is omitted.

In the third embodiment, the rotary shaft 32 of the motor 30 extends in the top-bottom direction. The first wall 22*a* and the second wall 22*b* of the motor case 22 are the top wall and the bottom wall, respectively, of the motor case 22. As with the case of the first embodiment, the disc 23 having the supply ports 23*a* and the first magnets 23*b* is fixed to the first wall 22*a*. The rotary shaft 32 of the motor 30 extends through the first wall 22*a* of the motor case 22. The supply-port operator 40 is attached to the rotary shaft 32 in such a manner as to coincide with the disc 23. The disc 23 and the supply-port operator 40 according to the third embodiment are configured the same as in the first embodiment and are not described herein. In FIGS. 7 and 8, the flow of the cooling oil 12 supplied through the supply ports 23*a* is represented by black-line arrows.

The second wall 22*b* as the bottom wall of the motor case 22 has a cooling-oil discharge port 28*a*. In the third embodiment, the second wall 22*b* has a cylinder 28, which projects downward from a central part of the second wall 22*b*. The cylinder 28 has an opening at the distal end thereof, and the opening serves as the cooling-oil discharge port 28*a*. In the motor 30, an end portion of the rotary shaft 32 that projects toward the second wall 22*b* does not extends through the second wall 22*b* and is provided with a fluid-pumping member 60. The fluid-pumping member 60 may be, for example, a propeller configured to generate a fluid pressure with the rotation thereof. In the third embodiment, the fluid-pumping member 60 is disposed within the cylinder 28. The cooling structure 10 according to the third embodiment further includes a lid 64 and an urging member 66. The lid 64 is capable of opening and closing the cooling-oil discharge port 28*a*. The urging member 66 urges the lid 64 from the outside of the motor case 22 toward the inside of the motor case 22. The urging member 66 may be, for example, a spring. One end of the urging member 66 is fixed to a vehicle body 68, on which the motor case 22 is mounted. The other end of the urging member 66 is coupled to the lid 64. In the third embodiment, a combination of the lid 64, the urging member 66, and the fluid-pumping member 60 serves as a discharge-port operator that is capable of opening and closing the discharge port 28*a*.

When the cooling structure 10 according to the third embodiment is in the normal state illustrated in FIG. 7 where the motor 30 is rotating, the fluid-pumping member 60 that is a propeller rotates with the rotation of the rotary shaft 32 of the motor 30. In the normal state, the cooling oil 12 is supplied through the supply ports 23*a* into the motor case 22 and is stored, particularly in the cylinder 28 at the bottom of the motor case 22. When the fluid-pumping member 60 rotates, the cooling oil 12 thus stored is pumped toward the discharge port 28*a* and generates a fluid pressure. The fluid pressure causes the lid 64 having been closing the discharge port 28*a* to act against the urging force exerted by the urging member 66, whereby the discharge port 28*a* is opened. Accordingly, the cooling oil 12 in the motor case 22 is discharged through the discharge port 28*a*.

In the lock-up state illustrated in FIG. 8 where the motor 30 is stationary, the rotation of the fluid-pumping member 60 is stopped with the stop of the rotation of the rotary shaft 32. In such a state, the urging force exerted by the urging member 66 causes the lid 64 to keep the discharge port 28*a* closed. In the lock-up state, the amount of the cooling oil 12 supplied through the supply ports 23*a* is greater than in the normal state, whereas the discharge port 28*a* is closed. Therefore, the cooling oil 12 accumulates in the motor case 22. Hence, the motor 30 is immersed in the cooling oil 12, whereby the heat capacity for absorbing heat from the coil 34 is increased. Thus, the coil 34 is cooled with an increased efficiency. In the third embodiment described above, a cooling-oil circuit 50 (not illustrated) including an oil cooler 58 may be added to the motor case 22, as with the case of the first embodiment.

The disclosure is not limited to the above embodiments, and various changes can be made without departing from the essence of the disclosure.

According to the motor cooling structure of the disclosure, the heat capacity is increased and the cooling efficiency is increased.

The invention claimed is:

1. A motor-cooling structure configured to cool a motor by using cooling oil, the motor being housed in a motor case, the motor-cooling structure comprising:

a supply-port operator capable of opening and closing a cooling-oil supply port provided in a first wall of the motor case, the supply-port operator being configured to make an opening ratio of the cooling-oil supply port greater when a rotary shaft of the motor is stationary than when the rotary shaft is rotating, the opening ratio being equal to an amount of time that the cooling-oil supply port is open over an amount of time that the rotary shaft is in a stated condition, the stated condition being one of a stationary state and a rotating state; and a discharge-port operator capable of opening and closing a cooling-oil discharge port provided in a second wall of the motor case, the discharge-port operator being configured to close the cooling-oil discharge port when the rotary shaft of the motor is stationary.

2. The motor-cooling structure according to claim 1, wherein the motor case comprises a first supply-side magnet disposed at the first wall, wherein the rotary shaft of the motor extends through the first wall of the motor case, wherein the supply-port operator comprises;

a supply-port-operator body having a disc shape and attached to the rotary shaft of the motor in such a manner as to be in contact with the first wall and to be rotatable together with the rotary shaft, the supply-port-operator body having a supply-use through-hole configured to move in a peripheral direction with rotation of the supply-port-operator body; and a second supply-side magnet disposed at the supply-port-operator body, the second supply-side magnet and the first supply-side magnet attracting each other, the second supply-side magnet being configured to move in the peripheral direction with the rotation of the supply-port-operator body, and wherein the supply-use through-hole is provided at a position where the supply-use through-hole coincides with the cooling-oil supply port when the first supply-side magnet and the second supply-side magnet coincide with each other during the rotation of the supply-port-operator body.

3. The motor-cooling structure according to claim 2, wherein the motor case comprises a first discharge-side magnet disposed at the second wall, wherein the rotary shaft of the motor extends through the second wall of the motor case, wherein the discharge-port operator comprises:

a discharge-port-operator body having a disc shape and attached to the rotary shaft of the motor in such a manner as to be in contact with the second wall and to be rotatable together with the rotary shaft, the discharge-port-operator body having a discharge-use through-hole configured to move in a peripheral direction with rotation of the discharge-port-operator body in such a manner as to be allowed to coincide with the cooling-oil discharge port; and a second discharge-side magnet disposed at the discharge-port-operator body, the second discharge-side magnet and the first discharge-side magnet attracting each other, the second discharge-side magnet being configured to move in the peripheral direction with the rotation of the discharge-port-operator body, and wherein the discharge-use through-hole is provided at a position where the discharge-use through-hole is displaced relative to the cooling-oil discharge port when the first discharge-side magnet and the second discharge-side magnet coincide with each other during the rotation of the discharge-port-operator body.

4. The motor-cooling structure according to claim 2, wherein the discharge-port operator comprises a trochoid pump configured to communicate with the cooling-oil discharge port of the motor case and operate in conjunction with the rotary shaft of the motor.

5. The motor-cooling structure according to claim 2, wherein the discharge-port operator comprises:

a lid capable of opening and closing the cooling-oil discharge port provided in the second wall;

an urging member that urges the lid from an outside of the motor case toward an inside of the motor case; and a fluid-pumping member disposed inside the motor case and attached to the rotary shaft of the motor in such a manner as to face the lid, the fluid-pumping member being configured to pump the cooling oil in the motor case toward the lid by rotating together with the rotary shaft, and wherein the lid is configured to open the cooling-oil discharge port in response to receive a fluid pressure generated by the fluid-pumping member.

6. The motor-cooling structure according to claim 1, wherein the motor case comprises a first discharge-side magnet disposed at the second wall, wherein the rotary shaft of the motor extends through the second wall of the motor case, wherein the discharge-port operator comprises;

a discharge-port-operator body having a disc shape and attached to the rotary shaft of the motor in such a manner as to be in contact with the second wall and to be rotatable together with the rotary shaft, the discharge-port-operator body having a discharge-use through-hole configured to move in a peripheral direction with rotation of the discharge-port-operator body in such a manner as to be allowed to coincide with the cooling-oil discharge port; and a second discharge-side magnet disposed at the discharge-port-operator body, the second discharge-side magnet and the first discharge-side magnet attracting each other, the second discharge-side magnet being configured to move in the peripheral direction with the rotation of the discharge-port-operator body, and wherein the discharge-use through-hole is provided at a position where the discharge-use through-hole is displaced relative to the cooling-oil discharge port when the first discharge-side magnet and the second discharge-side magnet coincide with each other during the rotation of the discharge-port-operator body.

7. The motor-cooling structure according to claim 1, wherein the discharge-port operator comprises a trochoid pump configured to communicate with the cooling-oil discharge port of the motor case and operate in conjunction with the rotary shaft of the motor.

8. The motor-cooling structure according to claim 1, wherein the discharge-port operator comprises:

a lid capable of opening and closing the cooling-oil discharge port provided in the second wall;

an urging member that urges the lid from an outside of the motor case toward an inside of the motor case; and a fluid-pumping member disposed inside the motor case and attached to the rotary shaft of the motor in such a manner as to face the lid, the fluid-pumping member being configured to pump the cooling oil in the motor case toward the lid by rotating together with the rotary shaft, and wherein the lid is configured to open the cooling-oil discharge port in response to receive a fluid pressure generated by the fluid-pumping member.

* * * * *